Oct. 10, 1961 F. K. LOW 3,004,106
PULSE TRANSMITTING AND RECEIVING CIRCUIT
Filed Dec. 31, 1956 4 Sheets-Sheet 1

INVENTOR
F. K. LOW
BY S. E. Hollander
ATTORNEY

INVENTOR
F. K. LOW
BY
S. E. Hollander
ATTORNEY

PULSE TRANSMITTING AND RECEIVING CIRCUIT

Filed Dec. 31, 1956 4 Sheets-Sheet 3

INVENTOR
F. K. LOW
BY S. E. Hollander
ATTORNEY

INVENTOR
F. K. LOW
BY S. E. Hollander
ATTORNEY 3,004,106
Patented Oct. 10, 1961

3,004,106

PULSE TRANSMITTING AND RECEIVING CIRCUIT

Frank K. Low, Orange, N.J., assignor to Bell Telephone Laboratories, Incorporated, New York, N.Y., a corporation of New York Filed Dec. 31, 1956, Ser. No. 631,612
17 Claims. (Cl. 179—16)

This invention relates to signaling systems and more particularly to the transmission and reception of pulsed signals. These signals may be utilized, for example, in telephone signaling systems to transmit decimal or coded information from an originating location to a remote installation. The information may be employed at the central office to complete connections in a telephone switching system or for other purposes. Known signaling systems utilized in connection with telephone switching operations require a certain minimum time interval between adjacent trains of pulses to differentiate between said trains of pulses and successive pulses in the same train, that is, to differentiate interdigital pauses from pauses between pulses of a digit.

Those prior art arrangements which predicate differentiation between adjacent pulse trains on the lapse of a minimum predetermined time interval between said trains, often require that the interval between adjacent pulses in the same train conform to substantially inflexible time limitations. The necessity for uniformity in interpulse timing is apparent since the lapse of too great a time interval between adjacent pulses may be confused with the lapse of a time interval between succeeding pulse trains. For this reason, rather precise requirements of uniformity in timing techniques, both interpulse and intertrain, are a necessary and integral part of the prior art systems.

Moreover, known signaling systems have been subject to the disadvantage of spurious operations in consequence of accidental line impulses or transmitter shocks which may occur during the interdigital interval.

In view of the limitations imposed by the prior art arrangements, it is an object of the invention to transmit high-speed impulses from an originating station to a remote location without the necessity of utilizing a predetermined elapsed time interval to differentiate between adjacent pulse trains.

Another object of this invention is to transmit high-speed current impulses from an originating telephone substation to a central office, utilizing pulses of equal or unequal time duration.

A further object of this invention is to safeguard the high-speed receiver against spurious line impulses during the interdigital interval.

Still another object of this invention is to provide for the reception of direct-current pulses in which the interval between adjacent pulses in the same pulse train may be nonuniform, thereby permitting pulses at varying frequency rates to be registered.

A further object of this invention is to transmit direct-current impulses at a more rapid rate than has been possible under the time limitations inherent in prior art systems of the decimal digit type.

Still another object of this invention is to permit rapid interdigital steering of pulse trains to selected register devices.

A feature of this invention is a high-speed direct-current signal gas discharge receiver adapted to receive and register decimal direct-current signals.

Another feature of this invention is a relay device for disabling the receiver during the interdigital period to avoid registration of spurious line impulses.

These and other objects and features may be accomplished in a decimal digit signaling system as disclosed illustratively herein, by the use of a direct-current keying transmitter at the originating location and a high-speed direct-current receiver at the central office location. The impulses are transmitted by a series of keys, each adapted to transmit a unique train of impulses characterizing a particular digit. Each key set includes a mechanical brush and commutator designed to provide a pattern of signals as the brush sweeps over the commutator segments. The signals are received in a high-speed direct-current gas discharge tube circuit which is designed to respond to each pulse by transferring the discharge location in a gas discharge tube from a particular electrode to the next adacent electrode.

Alternatively, these and other objects and features may be accomplished by the use of a magnetic shift register at a step-by-step local telephone central office and a high-speed direct-current receiver at a tandem office location. Reconstruction code facilities for reconstructing the code digits and the digit dialed into the outgoing trunk after seizure thereof are provided. These digits are temporarily stored in the shift register which is stepped along at dial pulse rate during dialing and at a much higher rate during interdigital intervals. In consequence of the high-speed outpulsing and relatively slow dial pulsing, the receiver at the tandem office, which may be similar to the direct-current receiver above described, rapidly overtakes the subscriber's dialing. Later dialed digits are transmitted through the shift register and directly over the trunk to the receiver at the tandem office.

These and other objects and features of the invention may be more readily understood by an examination of thde accompanying specification, appended claims and attached drawings in which:

FIG. 1 is a circuit illustrating the transmitter circuit portion of an exemplary embodiment of the present invention;

FIG. 2 includes a series of graphic representations of the brush action of and the impulse trains generated by the transmitter of FIG. 1;

Certain aspects of the instant disclosure are disclosed in an application for patent of A. E. Joel, Jr. Serial No. 610,188, entitled "High Speed Signaling System Using Magnetic Storage" and filed on September 17, 1956.

For clarity of exposition, the two alternative embodiments of the present invention will be separately described, first generally, then specifically.

GENERAL DESCRIPTION—KEY TRANSMITTER OPERATION

Figure 1:
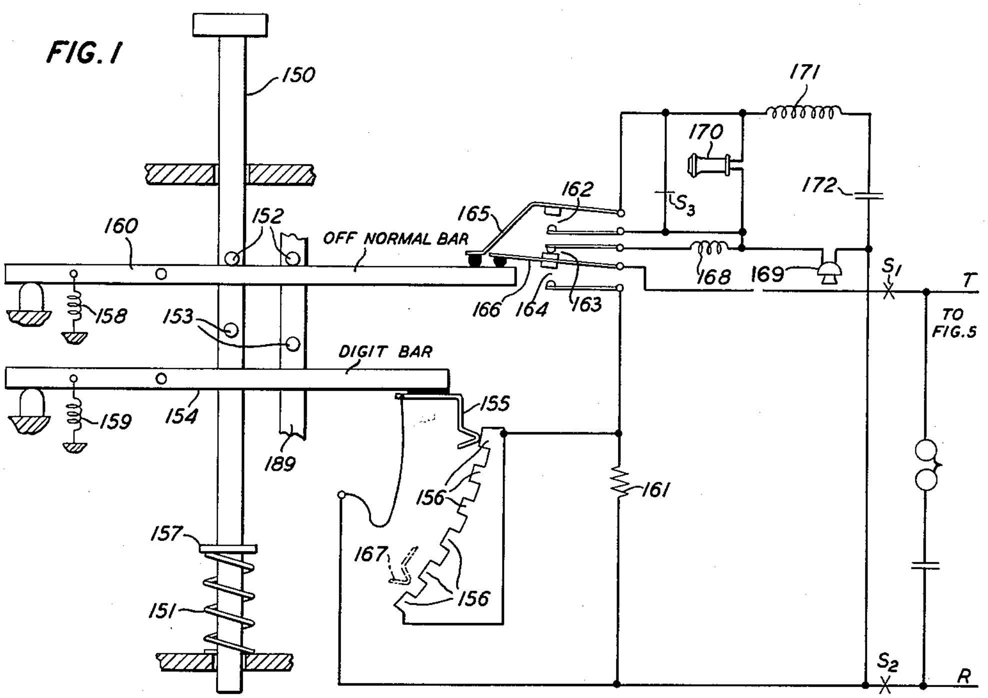

FIG. 1 illustrates a keying device suitable for use as part of the first embodiment of the present invention. A key shaft 150 is shown which may be depressed in opposition to the resistance of spring 151. Suitable projections 152 and 153 on the shaft are arranged to provide certain desired switching operations. The separation between projection 153 and armature 154 is predetermined to allow for varying movements of armature 154 and consequently brush 155. Commutator segments 156 are sequentially contacted by brush 155 in its translation through an arc determined by the clearance between armature 154 and projection 153 and the position of key shaft stop 157. Springs 158 and 159 serve to return armatures 160 and 154, respectively, to their normal positions. It is understood that although only one key shaft is illustrated in FIG. 1, nine similar keys, such as key 189, each adapted to provide a unique code pattern, hereinafter explained, are required.

When key 150 is depressed, projection 152 bears against armature 160, releasing springs 165 and 166. Contacts 162 and 164 are closed whereas contacts 163 are opened. The loop circuit which initially extended over the tip and ring conductors is open-circuited at contacts 163. This open-circuit condition provides a gate opening pulse which conditions the gas tube receiver of FIG. 5 for reception of information pulses as explained herein.

The continued depression of the key results in the closing of contacts 164 thereby closing the line loop over a circuit which may be traced from the tip conductor, switchhook contacts S1, contacts 164, commutator segment 156, brush 155, switchhook contacts S2 to the ring conductor R. Continued further depression and release results in alternately closing the line loop and inserting resistance 161 in series therewith a number of times proportional to the value of the digit transmitted. A gate closing pulse, similar to the gate opening pulse is generated when contacts 164 are opened on the return stroke. This information is received and registered in the gas stepping tube receiver, also as explained herein.

GENERAL DESCRIPTION—AUTOMATIC DIRECT-CURRENT OUTPULSING

In accordance with the second embodiment of the invention, a subscriber OS (FIG. 3), desiring a connection to a line terminating in an office in a toll area, by removing his receiver from the switchhook starts an idle line finder paired with a first selector in search of his line. As soon as the line is found, dial tone is transmitted. The subscriber then proceeds to dial the called directory number. In response to the dialing of one or more of the office code digits, the selector switches of a switching train are operated to extend a connection from the calling line to an outgoing trunk, over which trunk a connection may be further extended to a tandem office in which a trunk to the wanted line terminates.

Following the seizure of the trunk, an idle sender in the tandem office to which said trunk is connected, is energized. The sender is provided with registers for registering the digits of the directory number dialed by the calling subscriber. To eliminate the possibility that a digit dialed by the subscriber might be lost during the time elapsing between the seizure of the trunk and before the idle sender becomes associated with the trunk, a magnetic shift register stage for registering a digit following the last code digit dialed to reach the trunk, is provided. Since the trunk may be seized in response to one, two or three code digits, the trunk digit register may record the second or third code digit or the first directory number digit.

When the tandem incoming sender is connected, a supervisory signal is sent from the tandem office to the local office to indicate readiness for pulse reception. At this time the two parts of the magnetic shift register are serially connected and the dialed information passes through the shift register at dialing speed during dial pulsing and at a much greater speed during the interdigital intervals. The digits are impressed on the trunk loop in the form of direct-current impulses by a pulse transmitter controlled by the shift register. A detecting circuit in the sender, including the gas stepping tube referred to above, is responsive to the signals conveyed over the trunk loop.

Figures 4, 6A, 6B:
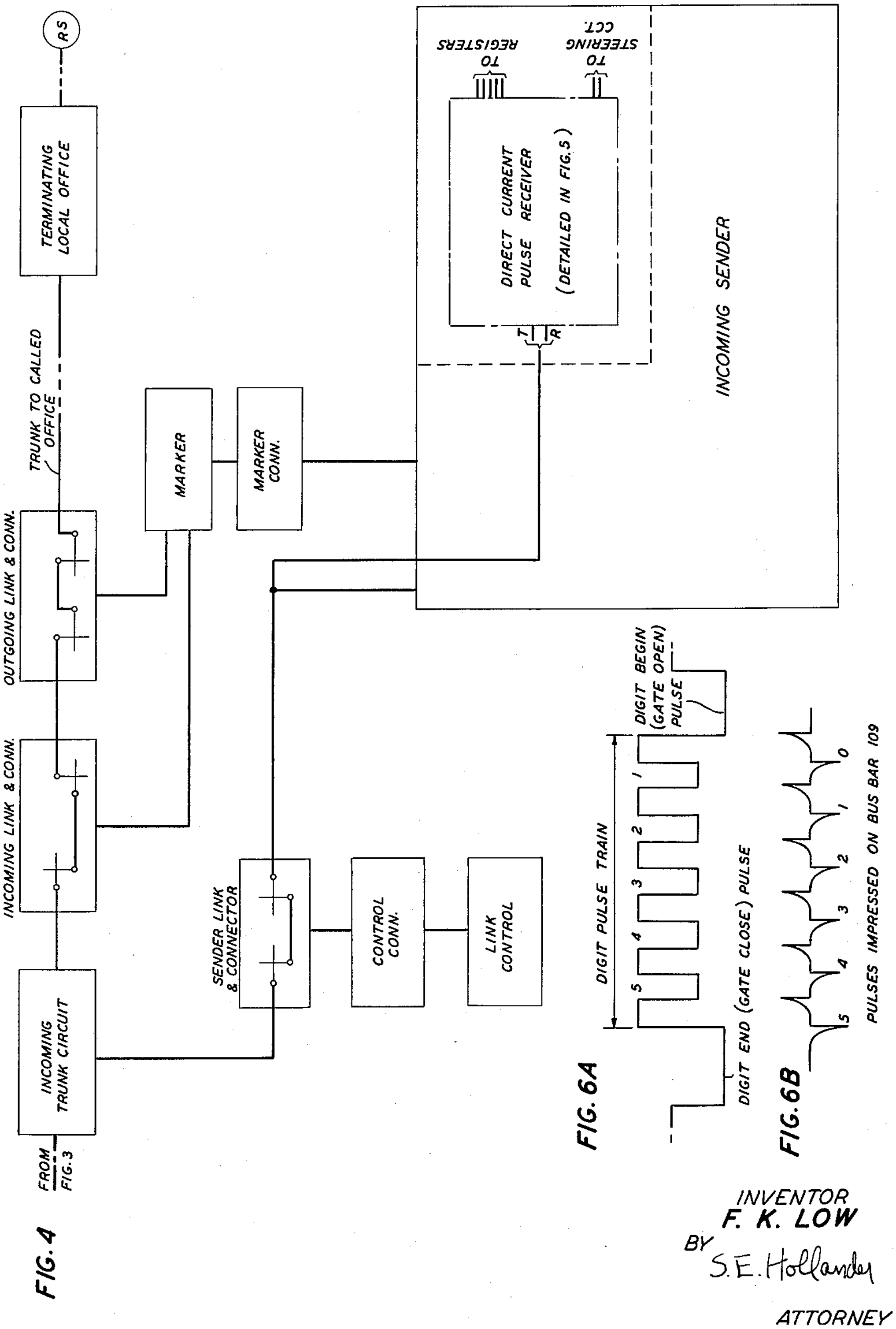
FIG. 4 is a block diagram of a typical tandem office circuit and common control equipment which may be used in conjunction with the invention.
FIGS. 6A and 6B, respectively, illustrate the characteristic signal pattern of a typical digit as it appears on the trunk conductors to the tandem office of FIG. 4 and at the receiver of FIG. 5.

When the tandem sender has received the digits required to complete the call, it sends another supervisory signal to the local office to dismiss the pulse transmitter, and connects to the tandem marker. The connection to the appropriate tandem outgoing trunk is made by the marker and the information stored in the incoming sender is transmitted over the trunk to the terminating local office to effect a connection to the called party RS (FIG. 4).

DETAILED DESCRIPTION—KEY TRANSMITTER OPERATION

1.1. *Transmission from originating station*

Figure 5:
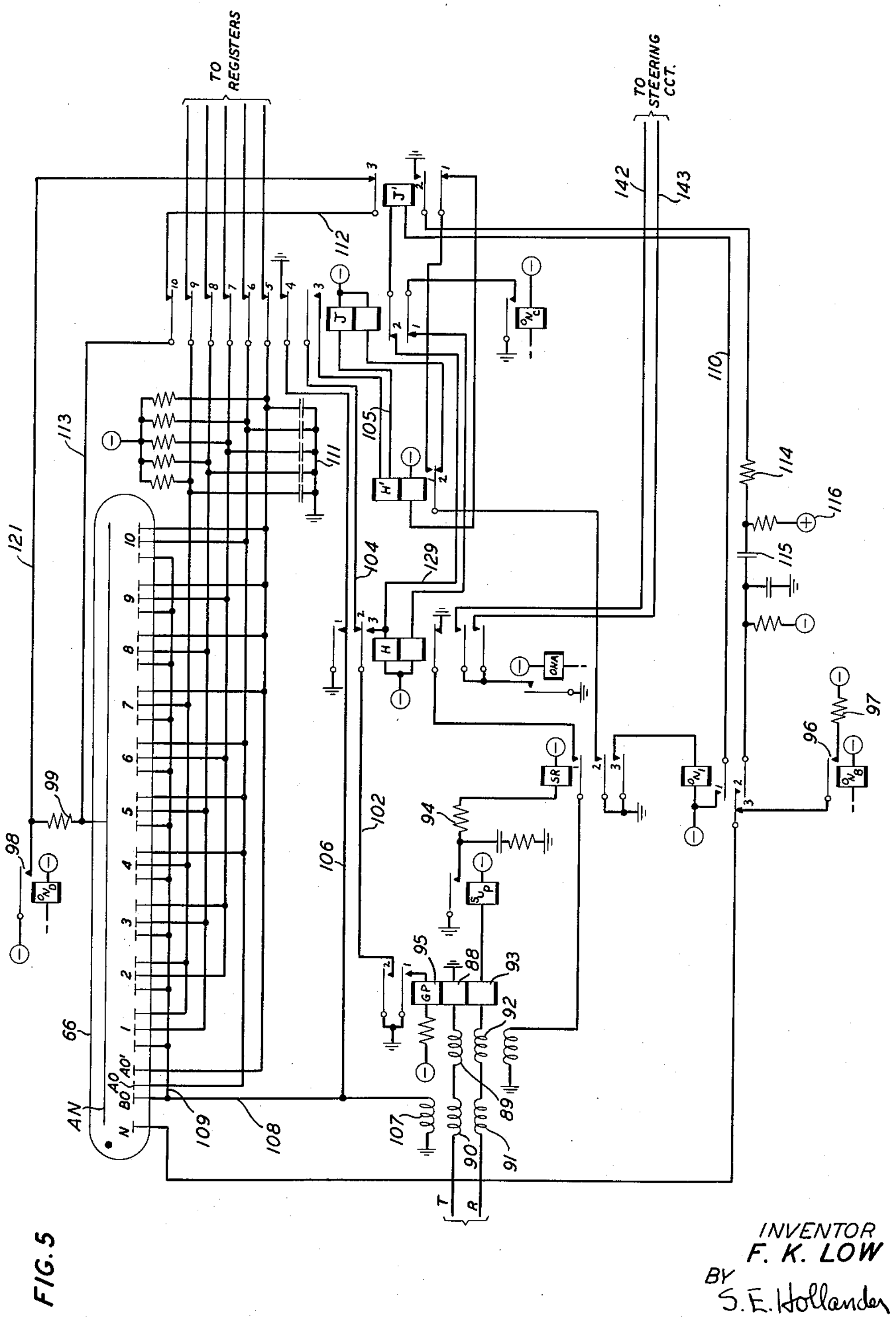
FIG. 5 shows the details of an embodiment of the high-speed direct-current receiving apparatus.

In order to transmit direct-current impulses from the originating station of FIG. 1 to the direct-current gas stepping tube receiver of FIG. 5, which may be part of an originating register at a central office location, the key transmitter of FIG. 1 is utilized. Although only a single key shaft is shown in full in FIG. 1, it is contemplated that ten separate keys each designed to transmit a particular digit will be used.

In each of the keys the separation between projection 153 and armature 154 is arranged to allow for varying movements of brush 155 thereby transmitting a selected number of pulses. For example, if brush 155 of FIG. 1 is depressed to the position shown in dotted outline at 167 and then released, a number of decimal pulses representing the digit 9 will be generated.

Figure 2:
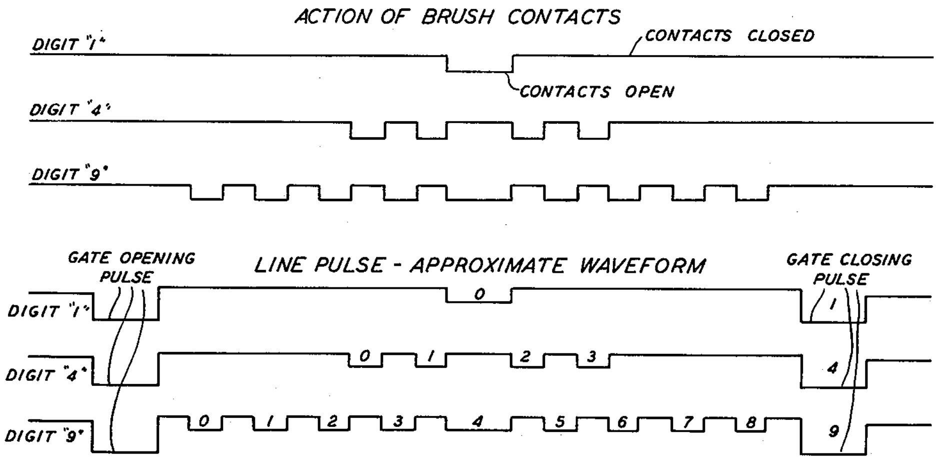

The initial depression of key 150 and the release of springs 165 and 166 closes contacts 162 and opens contacts 163. This produces an open-circuit condition in the line loop of tip and ring conductors which previously was closed from the tip conductor T, switchhook contacts S1, contacts 163, coil 168 and through the parallel circuits of transmitter 169, receiver 170, coil 171, condenser 172, switchhook contacts S2 to the ring conductor. This open-circuit condition results in the transmission of a gate opening pulse as shown in the lower three wave forms of FIG. 2. The gate opening pulse enables the detecting and counting circuit of FIG. 5, as explained hereinafter. Continued depression of key 150 results in the closing of contacts 164 which places a substantially short-circuit impedance across the tip and ring conductors through a circuit which may be traced from the tip conductor T, switchhook contacts S1, contacts 163, commutator segment 156, brush 155 and over an obvious circuit to switchhook contacts S2 and the ring conductor R. Further depression of the digit key 150 actuates armature 154 and drives brush 155 past commutator segment 156 resulting in alternately short-circuiting the line loop and placing resistor 161 in series with the line loop. Thus, a series of line pulses, representative ones of which are illustrated in FIG. 2, are created. In the embodiment shown in FIG. 1, travel of brush 155 to the position shown in dotted outline at 167 and return generates a series of line pulses including a gate closing pulse as shown in the bottom wave form of FIG. 2. The action of the brush contacts 155 with respect to commutator segment 156 is shown in the top three lines of the diagram of FIG. 2.

Thus, it is seen that by limiting the travel of brush 155, in accordance with a predetermined digital value, a preselected number of pulses may be generated. A subscriber may, by depressing the appropriate keys representing the digits of the called directory number, rapidly transmit direct-current pulses representative of said called number.

1.2 *Conditioning of receiver at central office*

When the switchhook contacts of S1, S2 and S3, of FIG. 1, are operated by the lifting of the subscriber handset, the loop to the remote or central office is closed and the circuit may be traced over the tip and ring conductors T and R of FIG. 1 to the tip and ring conductors of FIG. 5 through intermediate switching trains (not shown herein) thereby operating relays SUP and GP (FIG. 5) over a circuit from ground, winding 88 of relay GP, dial tone coil 89, pulse repeat coil 90, over the loop and return to pulse repeat coil 91, dial tone coil 92, winding 93 of relay GP, winding of relay SUP and negative battery. In operating, relay GP, at its No. 1 contacts, closes a circuit through winding 95 which produces a flux opposing that created by the operating windings 88 and 93 to permit a higher degree of sensitivity in release of relay GP. Operation of relay SUP results in the operation of relay SR, a slow release relay, over a path from ground, contacts of relay SUP, resistance 94, operating winding of relay SR to negative battery.

Prior to the operation of relays GP and SUP, relays ONA, ONB, ONC and OND of FIG. 5 are energized by off-normal contacts in the central office circuitry, when the circuit is seized, by means not shown herein. As a result, contacts 96 of relay ONB are closed, placing a negative potential on cathode N of the stepping tube over a path from negative battery, resistance 97, contacts 96 of relay ONB, No. 3 transfer contacts of relay ON1, to cathode N. The anode AN of the stepping tube has a positive potential impressed thereon from positive battery, contacts 98 of relay OND, resistance 99 to the anode of the gas stepping tube 66. In consequence of the voltage developed therebetween, a discharge path is formed between cathode N of the gas stepping tube and the anode AN thereof.

The operation of relay SR, referred to above, results in the operation of relay ON1 through the closure of the No. 3 contacts of relay SR. Relay H operates over a circuit from ground, contacts of relay ONC, No. 1 contacts of relay J, lower operating winding of relay H to negative battery. In operating, relay H locks up over its upper winding through a circuit including contacts 3 of relay H, conductor 102, contacts 2 of relay GP to ground.

Relay J operates from ground, contacts 2 of relay SR, contacts 2 of relay H', through the lower operating winding of relay J to negative battery. In operating, relay J, at its No. 10 contacts, removes the shunt across resistance 99, which previously extended over conductor 121, No. 3 contacts of relay J', conductor 112, No. 10 contacts of relay J and conductor 113.

1.3 *Reception of signals at remote station*

When key 150 is operated, thus opening contacts 163, the line loop is open-circuited over the path previously traced, thereby releasing relay GP of FIG. 5. Relay H releases at the No. 2 contacts of relay GP. Relay J remains operated at this time through the path previously traced. After the completion of the gate opening pulse, when contacts 164 are closed, relay GP reoperates over the circuit traced above.

In consequence of the reoperation of relay GP, relay H' operates from ground, No. 2 contacts of relay GP, conductor 102, No. 2 contacts of relay H, conductor 104, No. 3 contacts of relay J, upper winding of relay H', conductor 105, upper operating winding of relay J to negative battery.

With relay H in the released condition and relay J in the operated condition, conductor 106 is no longer grounded at either the No. 1 contacts of relay H or the No. 4 contacts of relay J, thereby permitting the entrance of line pulses through the pulse repeat coil 107 and conductor 108 to bus bar 109. Coil 107 is poled to produce negative pulses on bus bar 109 in response to negative pulses on the line conductors. As each digit pulse (caused by the sweeping of brush 155 over commutator segments 156) is received in the pulse repeat coils 90 and 91 and conveyed by induction to coil 107 and conductor 108 to bus bar 109, the discharge path in the gas stepping tube is moved along as a result of the geometry of the tube from one position to the next succeeding position. The location of the final discharge path thereby represents the number of pulses that have been impressed on bus bar 109, as shown graphically in FIG. 6B for the digit 5.

It will be noted that each of the electrode positions has been triplicated in order that the cathodes 1–10 of each of the decimal representations of the stepping tubes may be directly related to the two-out-of-five code designation of the decimal character represented. An analysis of the relationship between the decimal code and the two-out-of-five code may be found in a text entitled "The Design of Switching Circuits" by Keister, Ritchie and Washburn, 1951. For details of a suitable type of gas stepping tube, reference may be made to Patent No. 2,575,370 to M. A. Townsend on November 20, 1951.

When all of the pulses in a train representing a digit have been registered in the gas stepping tube 66, the line circuit is again momentarily opened by the opening of contacts 164 at the originating station to provide a gate closing pulse, to which relay GP responds by opening its contacts. It will be noted that the gate closing pulse also serves as the final pulse for shifting conduction in tube 66; thus a total of five pulses represents the digit 4 as shown in FIG. 2. Gas tube 66 has accordingly been designed to register the first pulse as a "0."

Relay J releases in consequence of the interruption of the previous holding circuit therefor at the No. 2 contacts of relay GP. The operating circuit for the lower operating winding of relay J was previously interrupted by the operation of relay H' and the opening of its No. 2 contacts.

Upon release of relay J, contacts 5 through 9 of said relay convey to digit resistors, including relays and associated indicating devices (not shown), the charges accumulated in the condensers designated generally as 111. Since the condensers have been energized due to the electrical discharges through the associated electrode paths, the information thus transferred represents the information periodically stored in the gas stepping tube.

The No. 10 contacts of relay J momentarily short-circuit impedance 99 over a path from positive battery, contacts 98 of relay OND, conductor 121, contacts 3 of relay J', conductor 112, contacts 10 of relay J, conductor 113 to the anode of the gas stepping tube. This action increases current flow through the condensers and provides additional power to operate the digit registers.

Relay H' does not release at this time since it is held operated through its lower winding from ground, No. 2 contacts of relay SR, No. 1 contacts of relay H', No. 1 contacts of relay J', lower winding of relay H' to negative battery. Relay H now reoperates from ground, contacts of relay ONC, No. 1 contacts of relay J, lower winding of relay H to negative battery. Operation of relay H again grounds conductor 106 through the No. 1 contacts of relay H, thereby shunting any transient signals which may appear in coil 107 and preventing their registration in the gas stepping tube.

After the conclusion of the gate closing pulse, and during the interdigital interval, relay GP again operates causing the operation of relay J' from ground, No. 2 contacts of relay GP, conductor 102, No. 3 contacts of relay H, conductor 129, No. 2' contacts of relay J, operating winding of relay J', conductor 110, No. 1 contacts of relay ON1 to negative battery. The operation of relay J' imposes a steep negative pulse on cathode N in the gas stepping tube over a path which includes ground, No. 2 contacts of relay J', resistance 114, condenser 115, No. 2 contacts of relay ON1, to cathode N. The potential on the plates of condenser 115 is rapidly shifted from somewhere near the potential of battery 116, which is at a relatively high positive potential, to somewhere near ground potential when the No. 2 contacts of relay J' are closed, thus imposing a sharp negative pulse on cathode N which serves to restore the discharge path to its initiating point at cathode N.

Relay H' now releases in consequence of the opening of the No. 1 contacts of relay J'. At this time, relay J reoperates from ground, No. 2 contacts of relay SR, No. 2 contacts of relay H', lower winding of relay J to negative battery. Relay J' releases as a result of the opening of the No. 2 contacts of relay J, restoring the circuit to the normal condition in readiness for the reception of the next train of pulses representing the next succeeding digit.

Sequential registration of a series of digits is effected by a steering circuit (not shown herein) under control of conductors 142 and 143.

It is apparent from an examination of FIGS. 2 and 6A that the width of a particular pulse in the train is not material, since the registration is made by the leading edge of the pulse. Similarly, the interval between adjacent trains may vary since the receiver is conditioned for operation by the gate opening pulse. The entire system is thus rendered substantially independent of the time factor.

As an alternative to the manual direct-current signaling procedure described above, the operation of automatic apparatus for high-speed direct-current signaling will be discussed in detail, as follows.

DETAILED DESCRIPTION—AUTOMATIC DIRECT-CURRENT OUTPULSING

2.1. *Seizure of outgoing portion of trunk circuit in local office*

Figure 3:
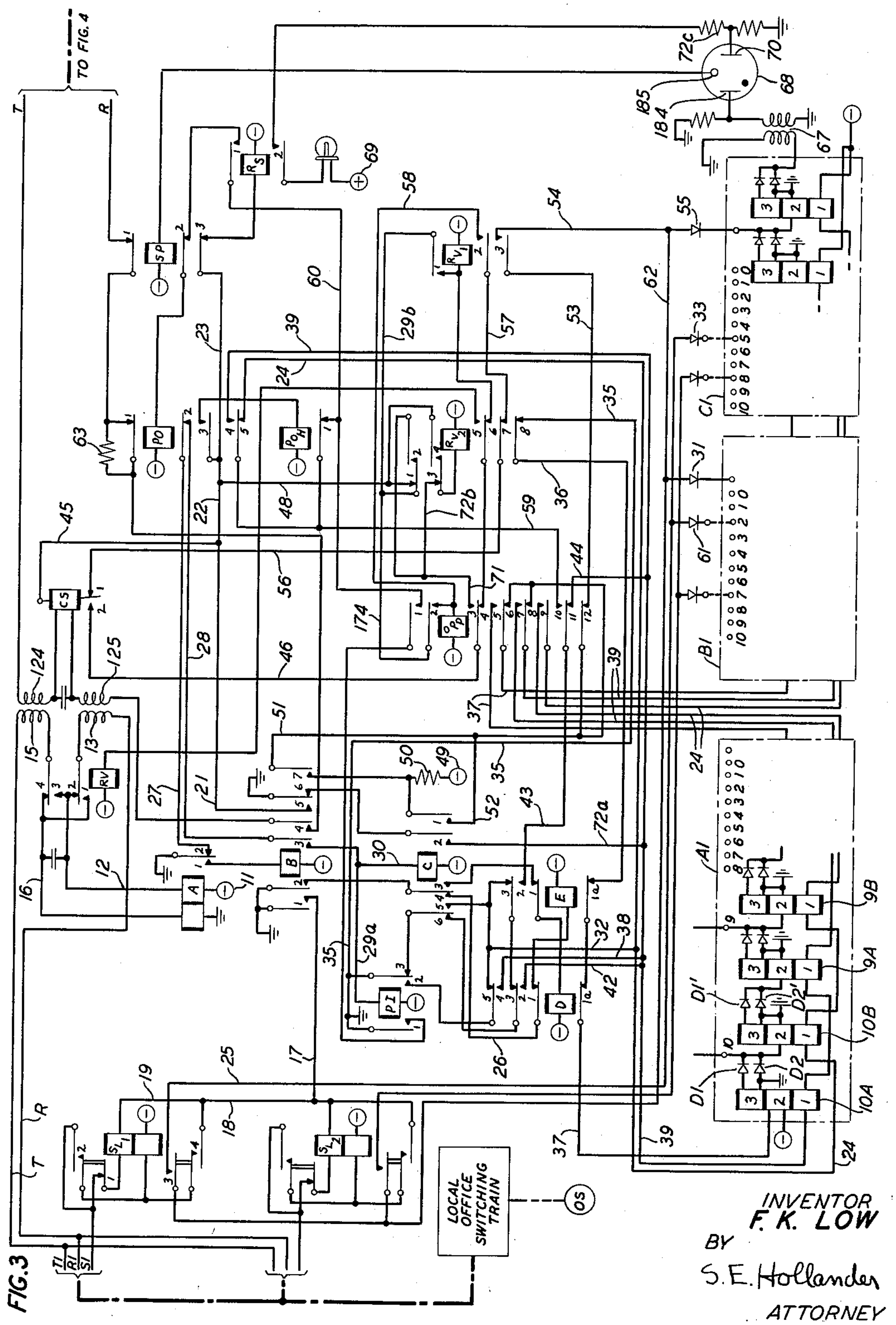
FIG. 3 is a circuit illustrating the local office portion of an exemplary embodiment of the present invention including a magnetic shift register and high-speed decimal direct-current outpulsing device.

When the trunk circuit in FIG. 3 is seized by a selector (not shown) over leads T1, R1 and S1, in response to dialing signals by the subscriber OS, relays A, B, SL1, RS and TK operate. Relay A operates over a path from battery 11, right operating winding of relay A, conductor 12, No. 2 contacts of relay RV, coil 13, conductor R, conductor R1, through preceding selector switches (not shown) and the subscriber's loop and back over conductor T1, conductor T, coil 15, No. 4 contacts of relay RV, conductor 16, left operating winding of relay A to ground. Relay A operates in response to each line closure and releases in response to each line open condition.

The operating path for relay B may be traced from ground, No. 1 contacts of relay A, winding of relay B to negative battery. Relay SL1 operates over a path from ground, No. 1 contacts of relay B, conductor 17, conductor 18, conductor 19, winding of relay SL1, No. 1 transfer contacts of relay SL1, to conductor S1 and negative battery at the preceding switch (not shown). A holding path for relay SL1 and preceding switches in the train may now be traced from ground, No. 1 contacts of relay B, conductor 17, conductor 18, No. 4 contacts of relay SL1, No. 2 contacts of relay SL1 to the sleeve conductor S1 and preceding switches as described, and to the lower winding of relay SL1.

Relay RS operates as a result of the operation of relay B over a path from ground, No. 5 contacts of relay B, conductor 21, conductor 22, conductor 23, No. 3 contacts of relay SP, winding of relay RS to negative battery. Relay E also operates at this time over a path which may be traced from ground, No. 2 contacts of relay B, No. 4 contacts of relay C, conductor 26, No. 1 contacts of relay D, through the winding of relay E to negative battery.

The trunk loop T and R to the tandem office is closed through the closure of the No. 4 contacts of relay B over a circuit including coil 124, winding of relay CS, coil 125, No. 4 contacts of relay B, No. 1 contacts of relay PO and the No. 1 contacts of relay SP. In response to the closure of the trunk loop, the incoming trunk in the tandem office (FIG. 4) initiates connection of an incoming sender in the usual manner. Reference may be made to Patent No. 2,281,636 granted May 5, 1942, to W.B. Strickler and to the patents therein referred to for a complete description of the tandem office portion of the system not shown in detail herein.

2.2. *Storage in magnetic shift register of digit dialed during connection of sender*

While the sender is being connected, the subscriber may dial an additional digit thereby causing relay A of FIG. 3 to release a number of times equal to the decimal value of the digit. Relay PI operates on each release of relay A over a path from ground, No. 2 contacts of relay A, conductor 27, No. 2 contacts of relay PO, conductor 28, No. 3 contacts of relay B, conductor 29*a*, winding of relay PI to negative battery. Relay C, a slow release relay, operates on the first release of relay A over a path from ground, No. 2 contacts of relay A, conductor 27, No. 2 contacts of relay PO, conductor 28, No. 3 contacts of relay B, conductor 30, winding of relay C to negative battery.

When relay PI operates with relay D in the released or normal condition, lead 24 into the shift register is grounded momentarily, thereby advancing information in the input part A1 of the register. The path for the energization of conductor 24 extends from ground, No. 2 contacts of relay PI, No. 5 contacts of relay D, conductor 32, to lead 24.

The magnetic shift registers A1, B1 and C1 of FIG. 3 are shown only in sufficient detail to contribute to an understanding of the present invention. For a comprehensive disclosure of the type of magnetic shift register or delay line suitable for use in conjunction with the present invention, reference may be made to an article entitled "Magnetic Delay—Line Storage" by An Wang, Proceedings of the I.R.E., April 1951 at page 401.

Each of the sections A1, B1 and C1 of the shift register includes a capacity for 12 items of information. Since in this configuration two magnetic cores are used for each information "bit," a total of 24 cores is included within each register section. Each of the cores is understood to have a rectangular hysteresis loop and includes shift winding 1, input winding 2 and output winding 3. Each magnetic core is capable of being magnetized to saturation in either of two states; either of the states then persists for an indefinite period in consequence of the high retentivity of the core or until a magnetic force in an opposite direction is applied to the core. In the embodiment illustrated, it will arbitrarily be assumed that a negative state is one in which the direction of retentivity is that which would result from the application of a shift or advance pulse to the shift windings 1, and a positive state is the same as that resulting from the application of a pulse to winding 2.

Rectifiers, such as D1 and D2, are inserted between the output winding of each core and the input winding of the succeeding core to restrict the effects of core action upon an adjacent core.

Assume, in the first instance, that all of the cores are in the negative magnetic state, a condition which may be obtained by applying advance pulses to the shift windings 1 over leads 39 and 24. Thus, initially a negative magnetizing force exists in each of the cores. If an input pulse is applied to core 10A over lead 37, thereby driving said core in the positive magnetic direction, a relatively large change of flux is exhibited by said core. This flux induces a voltage in winding 3 of core 10A which will tend to induce current flow that will be blocked by diode D1. Subsequently, a shift pulse applied to winding 1 of core 10A over lead 39 will tend to return said core, and all other cores to which conductor 39 is connected, to the negative magnetic saturation condition. In so doing, the relatively large change in flux produced in core 10A will induce a current in winding 3 which will travel from ground through winding 3 of core 10A, diode D1, winding 2 of core 10B to ground. This current will produce a flux in core 10B driving said core to the positive saturation condition. Thus, current will be induced in winding 3 of core 10B but will be blocked from flowing by diode D1', thereby isolating the effects of the change of the core's magnetic state.

To further advance the information contained in core 10B to core 9A, an advance pulse is applied to conductor 24 which traverses the shift windings 1 of cores 10B, 9B, etc. This advance pulse reconditions core 10B to the negative magnetic state, inducing in the winding 3 of core 10B a current (which traverses a similar path to that previously described for core 10A) which flows through winding 2 of core 9A, thereby establishing a positive saturation condition in core 9A and returning core 10B to the negative magnetic state. An additional current induced in winding 2 of core 10B as a result of the flux change therein is shunted to ground through diode D2 to prevent interference with core 10A. Currents induced in core 9A are isolated from interference with adjacent cores by the diodes connected to said core.

In this manner, by alternately energizing conductors 39 and 24, information stored in any portion of the shift register is successively advanced through all the cores of the register.

Sections B1 and C1 of the register include facilities for reading information directly into said register as a means of reconstructing the code digits which the subscriber dialed and expended in reaching the outgoing trunk portion of FIG. 3. It will be noted that contacts 3 of relay SL1 control a path over conductor 25 to sections B1 and C1 of the magnetic shift register. Conductor 25 is connected to core terminal 2 of section B1 through diode 61 and is also connected to core terminal 5 of section C1 through diode 33. This illustrates a modified form of the so-called "point of seizure" method of code reconstruction wherein the digits to be reconstructed are related to the point at which the trunk has been seized by a selector. Contacts 3 of relay SL1, in effect, indicate that the trunk has been seized by a selector associated with relay SL1 which has been operated in response to the dialing of decimal digits 5 and 2. Similarly, it may be shown that if relay SL2 were operated in response to the seizure of the trunk circuit by the selector associated therewith, the digits to be reconstructed and stored in the delay line will be decimal digits 8 and 7.

Continuing, the detailed description, the operation of relay C of FIG. 3, at its No. 4 contacts, open the operating path of relay E. When relay E has fully released, an operating circuit for the energization of relay D is completed from ground, No. 2 contacts of relay B, No. 3 contacts of relay C, No. 1 contacts of relay E, through the winding of relay D to negative battery. During the interval which obtains prior to the operation of relay D, that is when relays D and E are both released, conductor 37 to the shift register is momentarily grounded, recording a mark at the beginning digit in the first position of the shift register. The path for the energization of conductor 37 may be traced from ground at relay PI, conductor 35, No. 8 contacts of relay RV2, conductor 36, No. 1A contacts of relay E, No. 1A contacts of relay D, conductor 37 to the magnetic shift register.

When relay D operates, it completes a path for energizing conductor 39 from ground, No. 2 contacts of relay PI, No. 4 contacts of relay D, conductor 38, conductor 39 to the magnetic shift register.

When relay A reoperates at the end of the first pulse, relay PI releases and grounds lead 24 of the shift register through the No. 3 contacts of relay PI, No. 5 contacts of relay C, conductor 32, to lead 24 and the magnetic shift register.

Continued advance of the shift register information proceeds as described above with alternate grounding of conductors 39 and 24 at the beginning and end of each dial pulse, respectively.

At the end of pulsing of the first digit, i.e., during the intedigital interval, relay C releases (when the No. 2 contacts of relay A remain open for a sufficient interval), preparing a path for the release of relay D. Prior to the release of relay D, however, lead 39 is momentarily grounded to step the information in the register, over a circuit including ground, No. 3 contacts of relay PI, No. 6 contacts of relay C, No. 2 contacts of relay D, conductor 42, conductor 39 to the magnetic shift register. The release of relay D results from the opening of the No. 3 contacts of relay C.

When both relays D and E are released, conductor 37 to the magnetic shift register is momentarily grounded to mark the end of a digit in the delay line, over a path including ground at relay PI, conductor 35, No. 8 contacts of relay RV2, conductor 36, No. 1A contact of relay E, No. 1A contacts of relay D, to lead 37 and the magnetic shift register. In time coincidence with the operation just described, lead 24 of the shift register is grounded through the No. 3 contacts of relay PI, No. 6 contacts of relay C, No. 3 contacts of relay D, No. 3 contacts of relay E, conductor 32 to lead 24 and the magnetic shift register.

The release of relays C and D prepares a path for the operation of relay E from ground, No. 2 contacts of relay B, No. 4 contacts of relay C, conductor 26, No. 1 contacts of relay D through the winding of relay E to negative battery. The operation of relay E causes a transfer of the ground condition from lead 24 to lead 39 thereby advancing both the digit begin and digit end storage pulses to the "B" cores in the A1 section of the register. A ground condition is applied to lead 39 from ground, No. 3 contacts of relay PI, No. 6 contacts of relay C, No. 3 contacts of relay D, No. 2 contacts of relay E, conductor 43, No. 11 contacts of relay OPP, conductor 44, conductor 39 to the magnetic shift register. The interruption of the ground condition on lead 24 to the magnetic shift register is caused as a result of the opening of the No. 3 contacts of relay E, upon operation of said relay.

2.3. *Reconstruction of digits dialed to reach trunk*

When the tandem sender is connected at the tandem office a supervisory signal, in which the trunk polarity is reversed, is transmitted from the tandem office to the local office by means, in the sender, not shown herein as not essential to an understanding of the present invention. Reference may be made to Patent No. 2,594,014 to W. T. Haines and J. B. Newsom and the patents referred to therein for a detailed explanation of this type of supervisory signaling. The reversal of trunk polarity causes polarized relay CS in the trunk loop to operate over an obvious circuit. Relay RV1 operates as a result of the operation of relay CS over a path from ground, No. 5 contacts of relay B, conductor 21, conductor 45, No. 2 contacts of relay CS, conductor 46, No. 4 contacts of relay OPP, No. 6 contacts of relay RV2, winding of relay RV1 to negative battery. The operation of relay RV1 completes a locking circuit for that relay from ground, No. 5 contacts of relay B, conductor 21, conductor 22, conductor 48, No. 1 transfer contacts of relay RV2, conductor 29*b*, No. 1 contacts of relay RV1, winding of relay RV1 to negative battery.

In operating, relay RV1 closes a path from battery through relay B operated and relay OPP normal to place into the right-hand portion of the shift register the code to be reconstructed. The marks at the beginning of each digit start from fixed points in the register and are impressed on the register through varistors. The value of these digits relates to the selector level from which the trunk circuit was seized. This is indicated by operated relay SL1, through the contacts of which are connected the conductors to the varistors which mark digit locations in the shift register, as perviously explained.

The marks placed into the shift register as a result of the operation of relay RV1 may be traced from battery 49, resistance 50, No. 7 contacts of relay B, conductor 51, No. 12 contacts of relay OPP, conductor 53, No. 3 contacts of relay RV1, conductor 54, varistor 55, and conductor 62, and varistor 31 to the associated No. 2 windings of the magnetic shift register.

In addition marks are placed in the No. 2 windings (not shown) of core 5B in section C1 and core 2B in section B1. The circuit for effecting this registration may be extended from the path previously traced to conductor 62, No. 3 contacts of relay SL1, conductor 25 to diodes 33 and 61. The insertion of this information in the shift register represents the reconstruction by the point-of-seizure method of the digits (five and two) dialed by the subscriber in reaching the tandem trunk. In this embodiment, the cross-connections between relay SL1 and the shift register reproduce the original identity, in code, of the digits expended to reach the trunk. If the trunk had been seized at relay SL2, the digits to be reconstructed would be eight and seven as seen from the connection between sections B1 and C1 and the contacts of relay SL2.

2.4. *Connection of direct-current receiver at tandem office*

At the tandem office (FIGS. 4 and 5) a pulse detecting and counting circuit including a gas stepping tube of the type described in Patent No. 2,575,370 to M. A. Townsend on November 20, 1951, is utilized. When the loop to the tandem office is initially closed through the No. 4 contacts of relay B, relays SUP and GP of FIG. 5 operate (following certain operations in the incoming trunk circuit and the extension of the trunk conductors into the receiver) over a circuit from ground through winding 88 of relay GP, dial tone coil 89, pulse repeat coil 90 through the intermediate switching train (FIG. 4) and over the trunk loop and return through pulse repeat coil 91, dial tone coil 92, winding 93 of relay GP, winding of relay SUP and negative battery.

The receiving circuit of FIG. 5 is subsequently conditioned for the reception of pulses in a manner identical to that described for "Detailed Description—Key Transmitter Operation" section 1.2 above.

2.5. *Outpulsing from shift register to tandem office*

The connection of the trunk at the tandem office to the sender and associated gas stepping tube receiver, initiates (by means not shown herein) a signal to the local office to begin outpulsing. This signal consists of removing the reversal of polarity on the trunk conductor leads to the tandem office. This second reversal of polarity releases relay CS (FIG. 3) over an obvious circuit, thereby completing a path for the operation of relay OPP from ground, No. 5 contacts of relay B, conductor 21, conductor 45, No 1 contacts of relay CS, conductor 56, No. 7 contacts of relay RV2, conductor 57, No. 2 contacts of relay RV1, conductor 58, winding of relay OPP to negative battery. Relay OPP, in closing its contacts 5–9, connects together the two portions of the magnetic shift register in order that they may be used in cascade. A locking path for relay OPP may be traced from ground at No. 5 contacts of relay B, conductor 21, conductor 22, conductor 48, No. 1 transfer contacts of relay RV2, No. 2 contacts of relay OPP, winding of relay OPP to negative battery. If at the time of the operation of relay OPP, relay C is released, denoting an interdigital interval, a path is closed to operate relay PO from ground, No. 3 contacts of relay PI, No. 6 contacts of relay C, No. 3 contacts of relay D, No. 2 contacts of relay E, conductor 43, No. 10 contacts of relay OPP, conductor 59, No. 1 contacts of relay POH, conductor 60, No. 1 contacts of relay RS, No. 2 contacts of relay SP, winding of relay PO to negative battery.

Operation of relay PO inserts resistance 63 in the trunk loop to tandem through the opening of its No. 1 contacts. Relay PO in operating, also grounds conductor 39 over a path from ground, No. 3 contacts of relay PI, No. 6 contacts of relay C, No. 3 contacts of relay D, No. 2 contacts of relay E, conductor 43, No. 10 contacts of relay OPP, conductor 59, No. 4 contacts of relay PO, conductor 39 to the magnetic shift register.

Conductor 24 to the shift register is grounded during the release time of relay PO over a path from ground, No. 3 contacts of relay PI, No. 6 contacts of relay C, No. 3 contacts of relay D, No. 2 contacts of relay E, conductor 43, No. 10 contacts of relay OPP, conductor 59, No. 5 contacts of relay PO, to lead 24 and the magnetic shift register.

With relay C in the released condition, relay PO is in a self-interrupting circuit with relay POH to produce trunk voltage or impedance changes and shift register advance pulses which may, for example, be at the rate of 200 per second.

The operation of relay PO described above, completes a circuit for the operation of relay POH from ground, No. 5 contacts of relay B, conductor 21, conductor 22, No. 3 contacts of relay PO, through the winding of relay POH to negative battery. Operation of relay POH, through its No. 1 contacts opens the circuit which was previously holding relay PO operated, thereby releasing the latter relay. Release of relay PO through its No. 3 contacts opens the operating circuit for relay POH. The alternating opening and closure of these relays, in sequence, continues to produce shift register advance pulses in conductors 39 and 24 thereby advancing the information in the shift register as previously described.

When a digit begin or end mark in the magnetic shift register is driven from the last "B" core in section C1 a voltage is produced across coil 67 sufficient to ignite the starter gap, anode 184 to cathode 185, of gas tube 68. Following this ignition the discharge transfers to the main anode in the usual manner. At this time relay SP operates from positive battery 69, No. 2 contacts of relay RS, resistance 72c, anode 70, main cathode 185 to the operating winding of relay SP and negative battery. Relay SP, in operating, interrupts the trunk circuit to tandem by opening its No. 1 contacts, in series with ring conductor R. The operating circuit for relay RS is opened at the No. 3 contacts of relay SP. Release of relay RS extinguishes gas tube 68 by removing the positive potential on anode 70 previously applied through the No. 2 contacts of relay RS and impedance 72c.

The release of relay RS, in addition, prevents the reoperation of relay PO by the opening of the No. 2 contacts of relay SP until relay RS is reoperated.

In the above manner the digit begin and end pulses generate gate opening and closing pulses by open circuiting the trunk loop. During the interdigital interval, after receipt of the start pulsing signal from the tandem office, the shift register is cleared of information and although additional voltage pulses are continuously transmitted to tandem by the pulsing of relay PO, the last open pulse sent was a digit end or gate closing signal and consequently, the subsequent voltage pulses are disregarded (as are spurious signals or transients) as will be seen in the following explanation of the receiver.

As additional digits are dialed by the customer they are stored in the shift register, as explained above, and are cleared out through the tandem trunk to the incoming receiver at tandem on a high speed basis during the interdigital interval. The characteristic voltage signal pattern, for the digit five, as it appears on the trunk to the tandem office and at bus bar 109 is shown in FIGS. 6A and 6B.

2.6. *Reception of signals in gas stepping tube receiver at tandem office*

When relay SP operates at the local office and open circuits the loop, relay GP (FIG. 5) releases, thereby releasing relay H at the No. 2 contacts of relay GP. Relay J remains operated at this time through the path previously traced. After the completion of the gate opening pulse, relay GP reoperates, when the current level is restored.

In consequence of the reoperation of relay GP, relay H' operates from ground, No. 2 contacts of relay GP, conductor 102, No. 2 contacts of relay H, conductor 104, No. 3 contacts of relay J, upper winding of relay H', conductor 105, upper operating winding of relay J to negative battery.

With relay H in the released condition and relay J in the operated condition, conductor 106 is no longer grounded at either the No. 1 contacts of relay H or the No. 4 contacts of relay J, thereby permitting the entrance of line pulses through the pulse repeat coil 107 and conductor 108 to bus bar 109. As each digit pulse (caused by the operation of relay PO) is received in the pulse repeat coils 90 and 91 and conveyed by induction to coil 107, conductor 108 and bus bar 109, the discharge path in the gas stepping tube is moved along as a result of the geometry of the tube from one position to the next succeeding position, the location of the final discharge path thereby representing the number of pulses that have been impressed on bus bar 109, as shown graphically in FIG. 6B for the digit 5, and explained in section 1.3 supra.

When the tandem office incoming sender has received all the required signals to complete the call it turns over the routing information for the call to a marker (FIG. 4), which functions to complete a connection between the incoming trunk circuit and an outgoing trunk in the desired trunk group. In addition, the sender transmits a supervisory signal consisting of a trunk polarity reversal back to the local office outgoing trunk. The signal operates relay CS in the outgoing trunk which in turn completes a path for the operation of relay RV2. This path may be traced from ground, No. 5 contacts of relay B, conductor 21, conductor 45, No. 2 contacts of relay CS, conductor 46, No. 3 contacts of relay OPP, conductor 71, conductor **72*b*, No. 3 transfer contacts of relay RV2 to the winding of relay RV2 and negative battery. Relay RV2 locks operated over its No. 4 contacts, conductors 48, 22 and 21** to the No. 5 contacts of relay B. Removal of the trunk polarity reversal releases relay CS in the trunk circuit, at which time relays RV1 and OPP are released by virtue of the opening of the No. 1 transfer contacts of relay RV2 and the release of relay CS.

Relays RV1 and OPP were held operated during the operation of relay CS and relay RV2 over a path including No. 5 contacts of relay B, conductor 21, conductor 45, No. 2 contacts of relay CS, conductor 46, No. 3 contacts of relay OPP, No. 2 contacts of relay RV2 and in parallel to conductor **29*b*, No. 1 contacts of relay RV1 to the winding of relay RV1 and conductor 174**, No. 2 contacts of relay OPP to the winding of relay OPP.

When the information stored in the sender has been transmitted to the terminating local office to effect a connection to the called party RS, conversation may ensue.

2.7. *Release of trunk circuit at local office*

At the termination of the call, relay A releases operating relays PI and C over paths previously traced. Release of relay A results in the opening of the operating circuit for relay B, which relay, upon release, in turn causes the release of relays C, PI, SL, RS and RV2, all of which have been held operated through the contacts of relay B. Relay SL1 is released as a result of the opening of the No. 1 contacts of relay B. Relay RS is released through the opening of the No. 5 contacts of relay B and relay RV2 is similarly released by the opening of the same contacts. Relays C and PI release in consequence of the opening of No. 3 contacts of relay B. Just prior to the release of relay C, leads 24 and 39 of the shift register are simultaneously grounded to clear out any control pulses which may be recorded therein over a path which may be traced from ground, No. 2 contacts of relay PI, No. 5 contacts of relay D, conductor 32, to lead 24 and from ground, No. 6 contacts of relay B, No. 2 contacts of relay C, conductor **72*a* to conductor 39**.

It is understood that the embodiments of the invention described above are exemplary only, it being obvious to those skilled in the art that various changes and modification may be made therein without departing from the scope and spirit of the invention.

What is claimed is:

1. A signaling system including a transmitter, a conductive channel and a receiver, said transmitter including means for varying the impedance of said channel to a high impedance condition, an intermediate impedance condition, and a low impedance condition, said receiver including means responsive to the variation of said impedance to said intermediate and low impedance conditions for registering the number of occurrences thereof, and means responsive to the variation of said impedance to said high impedance condition for enabling and disabling said registration means, said signaling system and said registration means being operative substantially independent of the time duration of operation of said transmitter.

2. A signaling system including transmitting means arranged to generate an initial electrical signal followed by a train of decimal electrical signals signifying a digit or character and a terminal electrical signal, receiving means connected to and controlled by said transmitting means including register means responsive to said decimal signals for registering the digit or character signified thereby, means responsive to the reception of said initial signal for enabling said register means, and means responsive to the reception of said terminal signal for disabling said register means, whereby said system is rendered substantially independent of the time duration of operation of said transmitting means.

3. In a telephone signaling system, a transmitter device including means for generating an initial electrical signal, a train of decimal electrical signals characterizing a digit and a terminal electrical signal, a substantially time independent receiver connected to and controlled by said transmitting device comprising a multicathode gas discharge tube having a plurality of distinct conductive positions, said tube being operative to advance the conductive position therein in response to the reception of said decimal signals and said terminal signal, means responsive to the reception of said initial signal for rendering said discharge tube operative, means responsive to the reception of said terminal signal for rendering said discharge tube inoperative, storage means connected to the cathodes of said discharge tube, and additional means responsive to the reception of said final signal for selectively actuating said storage means in accordance with the number of positions advanced, whereby said receiver is rendered operative independent of the time duration of said electrical signals and independent of the time duration between adjacent signals in the same train and between adjacent trains.

4. A signal transmission system including a signaling device arranged to generate an initial electrical signal followed by a train of decimal signals characterizing a digit and a terminal electrical signal, receiving means connected to and controlled by said transmitting means including a pulse register comprising a multicathode gas discharge tube having a plurality of distinct conductive positions, a pulse receiving circuit connected to the cathodes of said discharge tube, means connected to said pulse receiving circuit and responsive to the reception of said initial electrical signal for rendering said discharge tube operative, said tube being operative to advance the conductive position therein in response to the reception of said decimal signals and said terminal signal, additional means connected to said pulse receiving circuit and responsive to the reception of said final electrical signal for rendering said discharge tube inoperative, storage means connected to the cathodes of said discharge tube and additional means responsive to the reception of said final electrical signal for selectively actuating said storage means in accordance with the number of positions advanced.

5. In a telephone directory number signaling system, a transmitting device including a plurality of key operated transmitter switches, each of said switches adapted to generate a series of direct-current pulses signifying a decimal digit, means responsive to the operation of said key operated transmitter for generating an initial gating pulse and a final gating pulse, a receiver connected to and controlled by said key operated transmitter including a multicathode gas discharge tube having a plurality of distinct conductive positions, said tube being operative to advance the conductive position therein in response to the reception of said final gating pulse and said decimal signals generated by said key operated transmitter, means responsive to the reception of said initial gating signal for enabling said discharge tube, means responsive to the reception of said final gating signal for disabling said discharge tube, storage means connected to said discharge tube, and additional means responsive to the reception of said final gating signal for selectively actuating said storage means in accordance with the number of positions advanced.

6. An automatic telephone signaling system including a key operated sender adapted to generate an initial signal, a train of direct-current decimal digit pulses and a final signal; a multicathode gas discharge tube receiver connected to and controlled by said sender, said receiver including means responsive to the reception of said initial signal for enabling said multicathode gas discharge tube and means responsive to the reception of said final signal for disabling said discharge tube, said tube being operative to advance the conductive position therein in response to the reception of said direct-current decimal signals and said final signal, a plurality of resistance-capacitance networks connected to the cathodes of said discharge tube, storage means connected to said resistance-capacitance networks, and additional means responsive to the reception of said final signal for selectively actuating said storage means in accordance with the number of positions advanced.

7. A signaling system including a transmitter adapted to assume a high output impedance level, an intermediate output impedance level and a low output impedance level, said intermediate and low impedance levels characterizing decimal digits to be transmitted, said high impedance levels characterizing control signals to be transmitted, a receiver connected to and controlled by said transmitter including means responsive to a first transfer of said transmitter to the high impedance level for enabling said receiver, registration means in said receiver responsive to the transfer of said transmitter to the intermediate and low impedance levels for registering the digital signification of the digit to be transmitted, and means responsive to the second transfer of said transmitter to the high impedance level for disabling said registration means, said receiver being operative independent of the time duration of said decimal digits and signals and independent of the time duration between adjacent digits and signals.

8. In an automatic telephone signaling system, a transmitter including means for generating a high direct-current voltage signal, an intermediate direct-current voltage signal and a low direct-current voltage signal, said intermediate and high voltage signals characterizing decimal digits, a receiver connected to and controlled by said transmitter including registration means responsive to the reception of said intermediate and high direct-current voltage signals for registering the digital signification of said signals, means responsive to the reception of a first of said low direct-current voltage signals for enabling said registration means, and means responsive to the reception of a second of said low direct-current voltage signals for disabling said registration means, whereby said receiver is rendered operative independent of the time duration of said signals and independent of the time duration between adjacent signals.

9. In an automatic telephone switching system, a telephone signal transmitter; a telephone signal receiver; and a conductive loop joining said transmitter and receiver; said transmitter including means for generating direct-current control signals and direct-current digital information signals; said receiver including registration means responsive to the reception of said direct-current digital information signals for registering the digital signification thereof and means responsive to the reception of one of said direct-current control signals for enabling the operation of said registration means, said receiver being operative substantially independent of the time duration of said transmitter generation.

10. In an automatic telephone signal system, a telephone signal transmitter; a telephone signal receiver; and a conductive loop joining said transmitter and receiver; said transmitter including means for generating direct-current control signals and direct-current digital information signals, said information signals being preceded and followed by one of said direct-current control signals; said receiver including registration means responsive to the reception of said direct-current information signals for registering the digital signification thereof, means responsive to the reception of a first of said control signals to enable the operation of said registration means and means responsive to the reception of a second of said control signals for disabling the operation of said registration means, whereby said receiver is rendered operative substantially independent of the time duration of said signals and of the time duration between adjacent signals.

11. In an automatic direct-current telephone signaling system, a telephone signal transmitter, a telephone signal receiver; and a conductive loop joining said transmitter and receiver; said transmitter including means for generating direct-current control signals and direct-current digital information signals, said digital information signals being preceded and followed by one of said direct-current control signals; said receiver including registration means responsive to the reception of said direct-current information signals for registering the digital signification thereof, storage means connected to said registration means, means responsive to the reception of the first of said control signals to enable the operation of said registration means, means responsive to the reception of a second of said control signals to disable the operation of said registration means, and additional means responsive to the reception of said second control signal for selectively actuating said storage means in accordance with the digital signification registered in said registration means, said receiver being operative substantially independent of the time duration of said signals.

12. In a substantially time independent telephone signaling system, a telephone signal transmitter, a telephone signal receiver; and a conductive loop joining said transmitter and receiver; said transmitter including impedance means; means responsive to the energization of said transmitter for open circuiting said conductive loop, for substantially short-circuiting said conductive loop and for inserting said impedance means in series with said loop, said short-circuiting of said loop and said inserting of said impedance in series with said loop being performed according to a digital code; said receiver including registration means responsive to the short-circuiting of said loop and the insertion of said impedance means in series with said loop for storing the digital signification represented thereby, and means responsive to the open circuiting of said conductive loop for enabling the operation of said registration means, whereby said signaling system is rendered substantially independent of the time duration of the energization of said transmitter.

13. In a time-free automatic telephone signaling system, a telephone signal transmitter; a telephone signal receiver; and a conductive loop joining said transmitter and receiver; said transmitter including impedance means, means responsive to the operation of said transmitter for open circuiting said conductive loop, for substantially short-circuiting said conductive loop and for inserting said impedance means in series with said loop, the short-circuiting of said loop and the inserting of said impedance in series with said loop being performed in accordance with a decimal code, said receiver including registration means responsive to the short-circuiting of said conductive loop and to the inserting of said impedance means in series with said loop for storing the digital signification represented thereby, means responsive to a first open circuiting of said conductive loop for enabling the operation of said registration means, and means responsive to a second open circuiting of said conductive loop for disabling the operation of said registration means, whereby said signaling system and said registration means are operative substantially independent of the time duration of operation of said transmitter.

14. In an automatic telephone signaling system, a telephone signal transmitter; a telephone signal receiver; and a conductive loop joining said transmitter and receiver; said transmitter including impedance means, means responsive to the operation of said transmitter for open circuiting said conductive loop, for substantially short-circuiting said conductive loop and for inserting said impedance means in series with said loop, said short-circuiting of said conductive loop and said inserting of impedance means in series with said loop being performed according to a decimal direct-current code signifying a digit or character; said receiver including registration means responsive to the short-circuiting and inserting of said impedance in series with said loop for storing the digital or character signification represented thereby, means responsive to a first open circuiting of said conductive loop for enabling said registration means, means responsive to a second open circuiting of said conductive loop for disabling said registration means, storage means connected to said registration means, and additional means responsive to said second open circuiting of said loop for selectively actuating said storage means in accordance with the digital or character signification registered in said registration means, whereby said system is rendered substantially independent of the time duration of said transmitter operations.

15. In an automatic telephone switching system employing direct-current signals, said system being substantially independent of the time duration of said direct-current signals, a telephone signal transmitter; a telephone signal receiver; and a conductive loop joining said transmitter and receiver; said transmitter including impedance means, means for generating direct-current control signals by open circuiting said conductive loop and direct-current digital information signals by alternately short-circuiting said loop and inserting said impedance means in series with said loop; said receiver including storage means comprising a gas discharge stepping tube having a plurality of distinct conductive positions, said tube being operative to advance the conductive position therein in response to said direct-current digital information signals and to alternate ones of said control signals, and means responsive to the reception of a first of said direct-current control signals for rendering said discharge tube operative.

16. In an automatic telephone switching system utilizing trains of direct-current signals, said system being operative independent of the interval between adjacent signals in the same train and the interval between adjacent trains, in combination, a telephone signal transmitter; a telephone signal receiver; and a conductive loop joining said transmitter and receiver; said transmitter including impedance means, means for generating direct-current control signals by open circuiting said conductive loop and direct-current digital information signals by alternately substantially short-circuiting said loop and inserting said impedance means in series with said loop; said receiver including a gas discharge stepping tube having a plurality of distinct conductive positions, said tube being operative to advance the conductive position therein in response to said direct-current digital information signals and to selected control signals, means responsive to the reception of a first of said direct-current control signals to render said discharge tube operative, and means responsive to the reception of a second of said direct-current control signals for rendering said discharge tube inoperative.

17. In an automatic telephone switching system employing direct-current signals, said system being independent of the time duration of said signals and time duration between individual signals and between groups of said signals, in combination, a telephone signal transmitter; a telephone signal receiver; and a conductive loop joining said transmitter and receiver; said transmitter including impedance means, means for generating direct-current control signals by open circuiting said loop and direct-current digital information signals by alternately substantially short-circuiting said loop and inserting said impedance means in series with said loop; said receiver including gas discharge stepping tube registration means having a plurality of distinct conductive positions, said tube being operative to advance the conductive position therein in response to the reception of said direct-current digital information signals and selected control signals for registering the digital signification thereof, means responsive to the reception of a first of said direct-current control signals for enabling the operation of said registration means, means responsive to the reception of a second of said direct-current control signals for disabling the operation of said registration means, storage means connected to said registration means, and additional means responsive to the reception of said direct-current control signal for selectively actuating said storage means in accordance with the digital signification registered in said registration means.

References Cited in the file of this patent

UNITED STATES PATENTS

| | | |
|---|---|---|
| 1,904,278 | Dickinson | Apr. 18, 1933 |
| 2,412,625 | Mallina | Dec. 17, 1946 |
| 2,428,550 | Burgener | Oct. 7, 1947 |
| 2,438,496 | Deakin | Mar. 30, 1948 |
| 2,621,242 | Lesigne | Dec. 9, 1952 |
| 2,648,831 | Vroom | Aug. 11, 1953 |
| 2,651,679 | Hartley | Sept. 8, 1953 |
| 2,694,801 | Bachelet | Nov. 16, 1954 |
| 2,700,146 | Bachelet | Jan. 18, 1955 |
| 2,706,215 | Van Duuren | Apr. 12, 1955 |
| 2,853,694 | Metzer | Sept. 23, 1958 |

FOREIGN PATENTS

| | | |
|---|---|---|
| 148,489 | Australia | Oct. 1, 1952 |